(12) United States Patent
Cohen et al.

(10) Patent No.: US 8,934,876 B1
(45) Date of Patent: Jan. 13, 2015

(54) METHOD AND SYSTEM FOR USE OF CALL ACTIVITY TO TRIGGER SOCIAL-NETWORK EXPANSION

(75) Inventors: Gabriel Cohen, Alameda, CA (US); Colin Gibbs, San Francisco, CA (US); Daniel Lehmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 573 days.

(21) Appl. No.: 13/224,948

(22) Filed: Sep. 2, 2011

(51) Int. Cl.
*H04M 3/42* (2006.01)

(52) U.S. Cl.
USPC ........................................ 455/414.1; 370/338

(58) Field of Classification Search
CPC .............. H04M 3/42; H04M 3/42102; H04M 3/42068; H04M 3/42059; H04M 2203/655
USPC ........................................ 455/414.1; 370/338
See application file for complete search history.

(56) References Cited

U.S. PATENT DOCUMENTS

2010/0015976 A1* 1/2010 Issa et al. .................... 455/435.1
2010/0281113 A1 11/2010 Laine et al.
2011/0151850 A1* 6/2011 Haaparanta et al. .......... 455/415

OTHER PUBLICATIONS

'Rainmaker for Google Apps and Gmail—New Feature: Connect on LinkedIn and Follow on Twitter', Blog printed from World Wide Web on Aug. 5, 2011.

* cited by examiner

*Primary Examiner* — Marcos Batista
(74) *Attorney, Agent, or Firm* — McDonnell Boehnen Hulbert & Berghoff LLP (57) ABSTRACT

Disclosed are a method, apparatus, and system for using call activity as a basis to trigger social-network expansion. Upon detecting threshold call activity between a first party and a second party and determining that a social-network group of the first party does not include a social-network connection with the second party, a process is triggered to add to the first party's social-network group a connection with the second party.

31 Claims, 7 Drawing Sheets

METHOD AND SYSTEM FOR USE OF CALL ACTIVITY TO TRIGGER SOCIAL-NETWORK EXPANSION

BACKGROUND

Unless otherwise indicated herein, the information provided in this background section is not admitted to be prior art merely by inclusion in this section.

In recent years, social-networking technology has gained widespread popularity and acceptance as a convenient way to connect and foster relationships with friends, family, and business colleagues.

In practice, a typical social-networking service will have many members (or "nodes") and will store profile data for each member, including data that defines connections or interrelationships between the member and various other members of the service. In particular, the connection data may define for each member one or more social-network groups, each including one or more other members with whom the member is connected. The social-networking service may then allow members to share information, data, content, and the like with other members of their social-network group(s) in a computer implemented, virtual environment. For instance, through interaction with the social-networking service, a member may conveniently receive social-network updates posted by other members with whom the member is connected and may view profile information such as connections of those other members.

Once a person establishes an account with a social-networking service, the person may build one or more social-network groups by adding connections to other people and organizations. The manner in which these connections are added, however, may vary from social-networking service to social-networking service. For instance, some social-networking services operate in a symmetric manner in which a member may submit a request to "friend" or add to the member's social-network group a connection with a specified party and the social-networking service then invites that party to become a connection in the member's social-network group and adds the requested connection only if the party accepts the invitation. On the other hand, other social-networking services operate in an asymmetric manner in which a member may submit a request to "follow" a specified party, and the social-networking service then adds to the member's social-network group a connection with that party without formally inviting and receiving an acceptance from the party.

SUMMARY

Disclosed herein is a method and corresponding apparatus and system to facilitate social-network expansion, by conveniently triggering addition of social-network connections based on phone call activity. In practice, for instance, when a determination is made that a social-network member engages in one or more phone calls (e.g., voice calls, video calls, fax calls, etc.) with a particular party, the method may involve automatically prompting the member to invoke a connection-function for adding that party to the member's social-network group. Furthermore, if a computing device has installed program applications for various different social-networking services, the method may involve determining in which of those social-networking services a device-user's social-network group does not currently include a connection with the call party, and automatically prompting the member to invoke a connection-function for one or more of the determined social-networking services.

Upon receipt of an affirmative response to a prompt for invoking a connection-function with respect to a particular social-networking service, the method may then further involve engaging the social-networking service, such as by calling a corresponding social-networking application, to cause a connection with the call party to be added to the member's social-network group in the manner appropriate for that social-networking service. For instance, if the social-networking service uses the symmetric model described above, the social-networking service may send to the call party an invitation to become a connection in the member's social-network group and may add the connection if and when the call party accepts. Alternatively, if the social-networking service uses the asymmetric model described above, the social-networking service may simply add a connection to the member's social-network group so that the member may then begin following the call party.

In one respect, the present method may thus involve detecting at least a threshold extent of call activity between a first party and a second party, and responsive to the detecting, making a determination of whether a social-network group of the first party includes a connection with the second party. The method may then involve, responsive to the determination being that the social-network group of the first party does not include a connection with the second party, causing a user interface to present a prompt to invoke a social-network connection function for adding to the social-network group a connection with the second party. Further, the method may then involve, after causing the user interface to present the prompt, receiving an affirmative response to the presented prompt and, in response to receiving the affirmative response, invoking the connection-function for adding to the social-network group a connection with the second party.

In another respect, the method may be implemented by a wireless communication device (WCD) such as a cell phone or other wirelessly-equipped device carrying out functions such as (i) detecting at least a threshold extent of call activity between the WCD and a call party, (ii) upon detecting at least the threshold extent of call activity between the WCD and the call party, making a determination of whether a social-network group of a user of the WCD includes a connection with the call party, and (iii) in response to the determination being that the social-network group of the user of the WCD does not include a connection with the call party, presenting on a user interface of the WCD a prompt for the user to invoke a connection-function for adding to the social-network group a connection with the call party.

In still another respect, the method may be implemented by a computer server carrying out functions such as (i) detecting at least a threshold extent of call activity between a first party and a second party, (ii) upon detecting at least the threshold extent of call activity between the WCD and the call party, making a determination of whether a social-network group of the first party includes a connection with the second party, and (iii) in response to the determination being that the social-network group of the first party does not include a connection with the second party, causing to be presented on a user interface a prompt for the first party to invoke a connection-function for adding the second party to the social-network group of the first party.

And in yet another respect, as noted above, the method may involve interworking with potentially multiple social-networking applications installed on a computing device (e.g., cellular telephone) operated by a first party. For instance, the method may involve registering in the computing device multiple social-networking applications corresponding respectively with multiple social-networking services, such as one application per social-networking service. And the method may involve the computing device detecting at least a threshold extent of call activity between the computing device and a second party. In turn, the method may involve, responsive to detecting at least the threshold extent of call activity between the computing device and the second party, (i) the computing device determining respectively for each of the social-networking services whether the second party is in a social-network group of the first party, and the computing device thereby identifying a subset of one or more of the social-networking services in each of which the second party is not in a social-network group of the first party, and (ii) the computing device presenting on a user interface a prompt designating the identified subset of one or more social-networking services, the prompt soliciting a selection of at least one of the one or more social-networking services of the subset.

The method may then involve the computing device receiving, in response to the presented prompt, input selecting at least one of the one or more social-networking services of the designated subset. And the method may then involve, responsive to the input, for each of the selected one or more social-networking services, the computing device calling the corresponding social-networking application to cause the social-networking application to engage a connection-function for adding the second party to the social-network group of the first party.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Referring to the drawings, as noted above, FIG. 1 is a simplified block diagram depicting an example system in which embodiments of the present method can be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

For instance, various functions described as being performed by one or more entities may be carried out by hardware, firmware, and/or software logic, such as by one or more processors executing program instructions. Further, where this description refers to a "server," it will be understood that the server function may be implemented by a single computer server or by numerous servers in a server-farm or clustered computing arrangement. Likewise, where this description refers to a "processor" or the like, it will be understood that the processor function may be implemented by a single processor or by numerous processors operating in parallel or otherwise operating to achieve the functions described.

Figure 1:
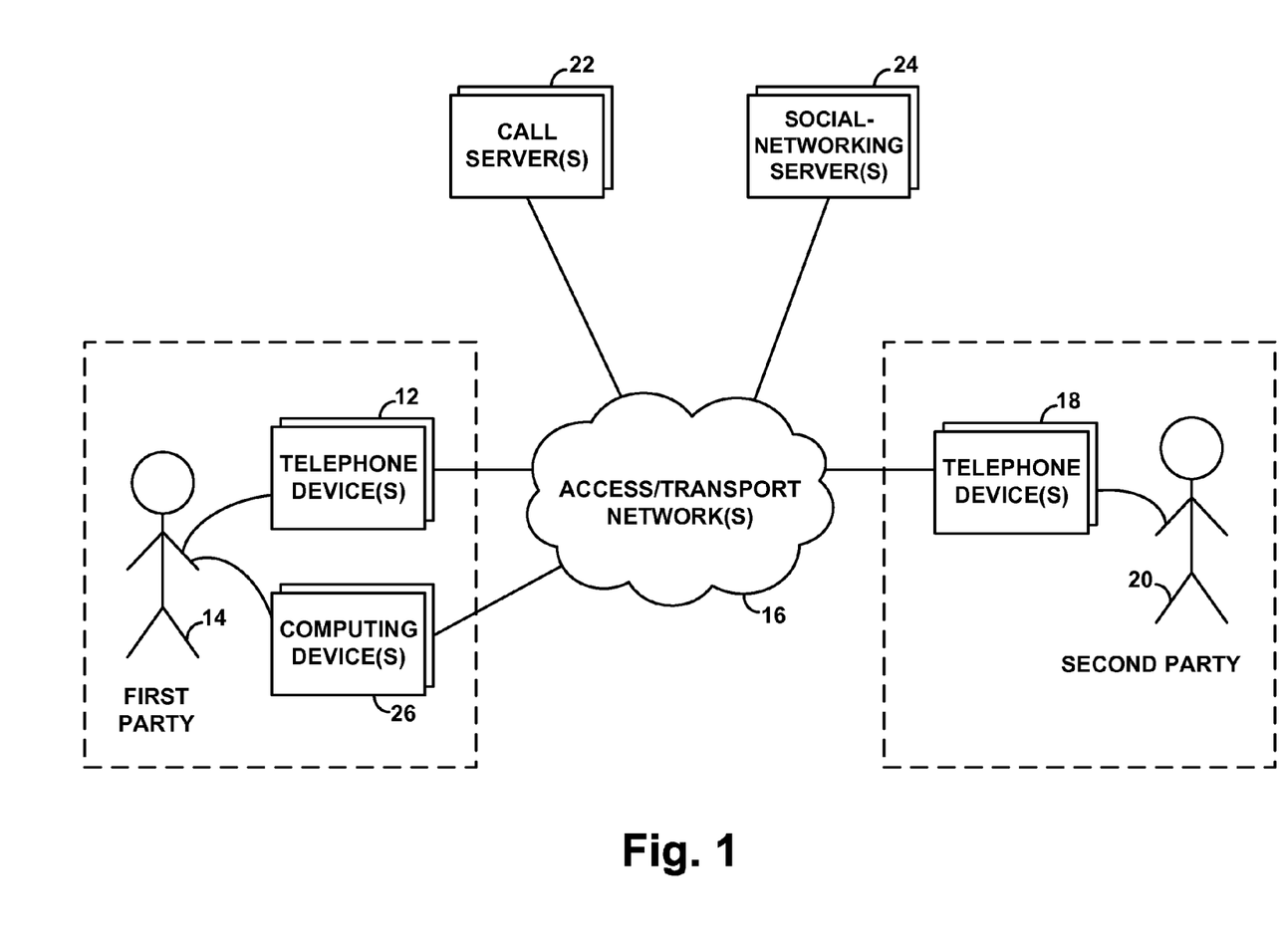
FIG. 1 is a simplified block diagram of a system in which embodiments of the present method can be implemented.

As shown in FIG. 1, the example system includes one or more telephone devices 12 that are operated by a first party 14 and that are arranged to communicate via access and/or transport network(s) 16 with one or more telephone devices 18 operated by a second party 20. Further shown sitting as nodes on or accessible via the access/transport network(s) 16 are one or more call servers 22 and one or more social-networking servers 24, as well as one or more other computing devices 26 that may also be operated by the first party 14.

With this example arrangement, the first party 14 may use the one or more telephone devices 12 to engage in phone calls (e.g., voice calls and/or video calls) via the access/transport network(s) 16 with second party 20, and the telephone device(s) 12 and/or call server(s) 22 may manage, maintain, and/or have access to a record of such call activity for current and past calls. Further, the first party 14 may be a member of one or more social-networking services hosted by the social-networking server(s) 24 and may use the one or more telephone devices 12 and/or one or more computing devices 26 to interact with the social-networking service(s).

For each social-networking service of which the first party 14 is a member, the first party may thus have at least one social-network group that currently defines zero or more social-network connections for the first party, and the social-networking server(s) hosting that social-networking service may maintain and/or have access to a profile record any and all such connections for the first party. Further, the one or more telephone devices 12 and/or computing devices 26 used by the first party 14 to interact with the social-networking service may also maintain and/or have access to a record of the connections in the first party's social-network group.

Figure 2:
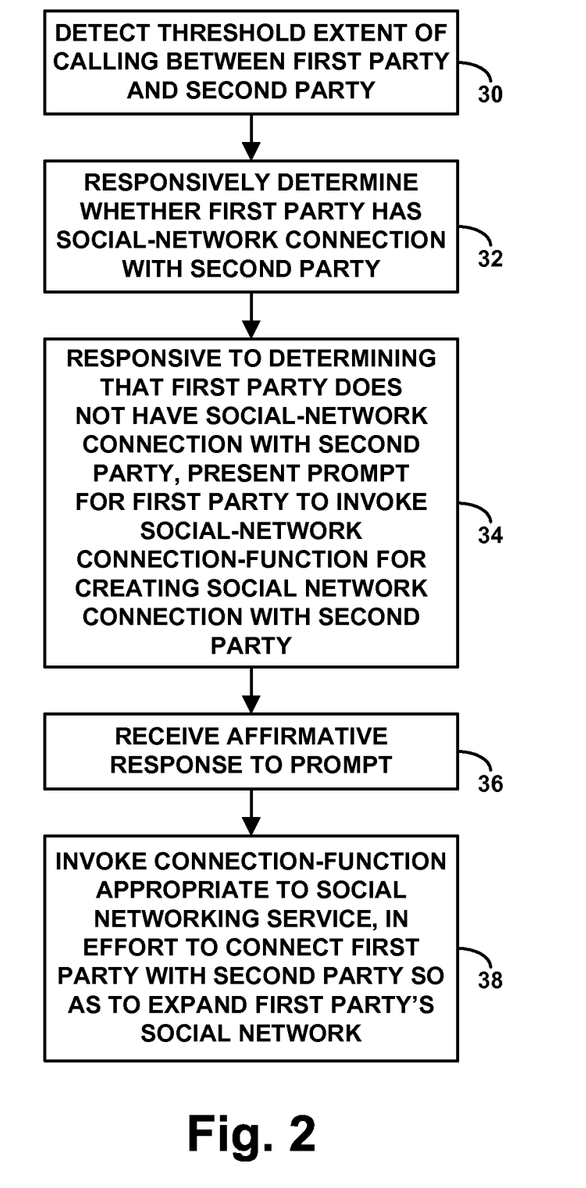
FIG. 2 is a flow chart depicting functions that can be carried out in accordance with the method

FIG. 2 next illustrates how the present method may apply in this arrangement. As shown in FIG. 2, at step 30, a processing system (such as one of the telephone devices 12, call servers 22, social-networking servers 22 and/or computing devices 26, for instance) may detect in first party's call activity a threshold extent of calling between the first party and the second party. For instance, the processing system may detect at least a predefined non-zero threshold number of calls and/or at least a predefined non-zero threshold duration of call activity between the first party and the second party. At step 32, in response to detecting that threshold extent of call activity between the first party and the second party, the processing system may then consult the first party's social-network connection data for each of at least one of the one or more social-networking services, to determine whether the first party's social-network group in that social-networking service currently includes a connection with the second party.

At step 34, for each social-networking service that the processing system thereby determines the first party's social-network group of the social-networking service does not currently include a connection with the second party, the processing system may then automatically cause to be presented on a user interface of a device (such as one of the telephone devices 12 or computing devices 26) a prompt for the first party to invoke a social-network connection-function for adding to the first party's social-network group a connection with the second party. In the event the processing system has determined for more than one social-networking service that the first party's social-network group does not include a connection with the second party, this prompt may list the social-networking services at to which the first party can invoke the connection function, and the first party may then conveniently decide in which if any of the presented social-networking services to invoke the connection-function.

In turn, at step 36, the processing system may then receive an affirmative response to the prompt, indicating the first party's decision to invoke the connection function with respect to one or more indicated social-networking services. And at step 38, for each social-networking service as to which the first party thereby decided to invoke the connection-function, the processing system may then invoke the connection-function in an effort to add to the first party's social-network group a connection with the second party, so as to expand the first party's social-network.

Practically speaking, to invoke the connection-function with respect to a given social-networking service, the processing system may convey to the social-networking service an identity of the second party, so as to cause the social-networking service to take action appropriate to the social-networking service for adding to the first party's social-network group a connection with the identified second party. For instance, the processing system may convey the second party identity to a social-networking application installed on one of the telephone devices 12 and/or computing devices 26 for the given social-networking service, or the processing system may convey the second party identity to logic in the applicable social-networking server 24. The recipient application and/or server may then take action appropriate for the social-networking service at issue, in an effort to add to the first party's social-network group a connection with the second party.

As noted above, the specific details and manner of this connection establishment effort may vary from social-networking service to social-networking service. For example, in a symmetric arrangement, the social-networking service may transmit an invitation to the second party and may then add the connection only if and when the second party accepts the invitation (and may not add the connection if the second party does not respond or rejects the request.) Whereas in an asymmetric arrangement, the social-networking service may simply add to the first party's social-network group a connection to the second party, which may allow the first party to begin "following" the second party such as receiving social-network updates posted by the second party for instance. Other examples are possible as well.

Note that although FIG. 1 depicts parties 14, 20 as individuals for ease of illustration, the present method is not necessarily limited such an arrangement. For instance, the method could just as well apply in an arrangement where either or each of parties 14, 20 is an organization, such as a business, a club, a family, or the like, as such organizations (by action of their members or automated equipment for instance) may also be capable of engaging in call activity and being members of social-networks.

For example, in the above process, the first party could be a person and the second party could be a business. In that case, a processing system may detect a threshold extent of call activity between the person and the business, and the processing system may then determine that the person's social-network group does not currently include a connection with the business and may responsively present on a user interface a prompt for the person to invoke a connection-function for adding to the person's social-network group a connection with the business. In this example, the connection may be a "follow" type connection, which, when established, may allow the person to then receive social-network updates such as coupons and other offers from the business.

2. Example Architecture

Figure 3:
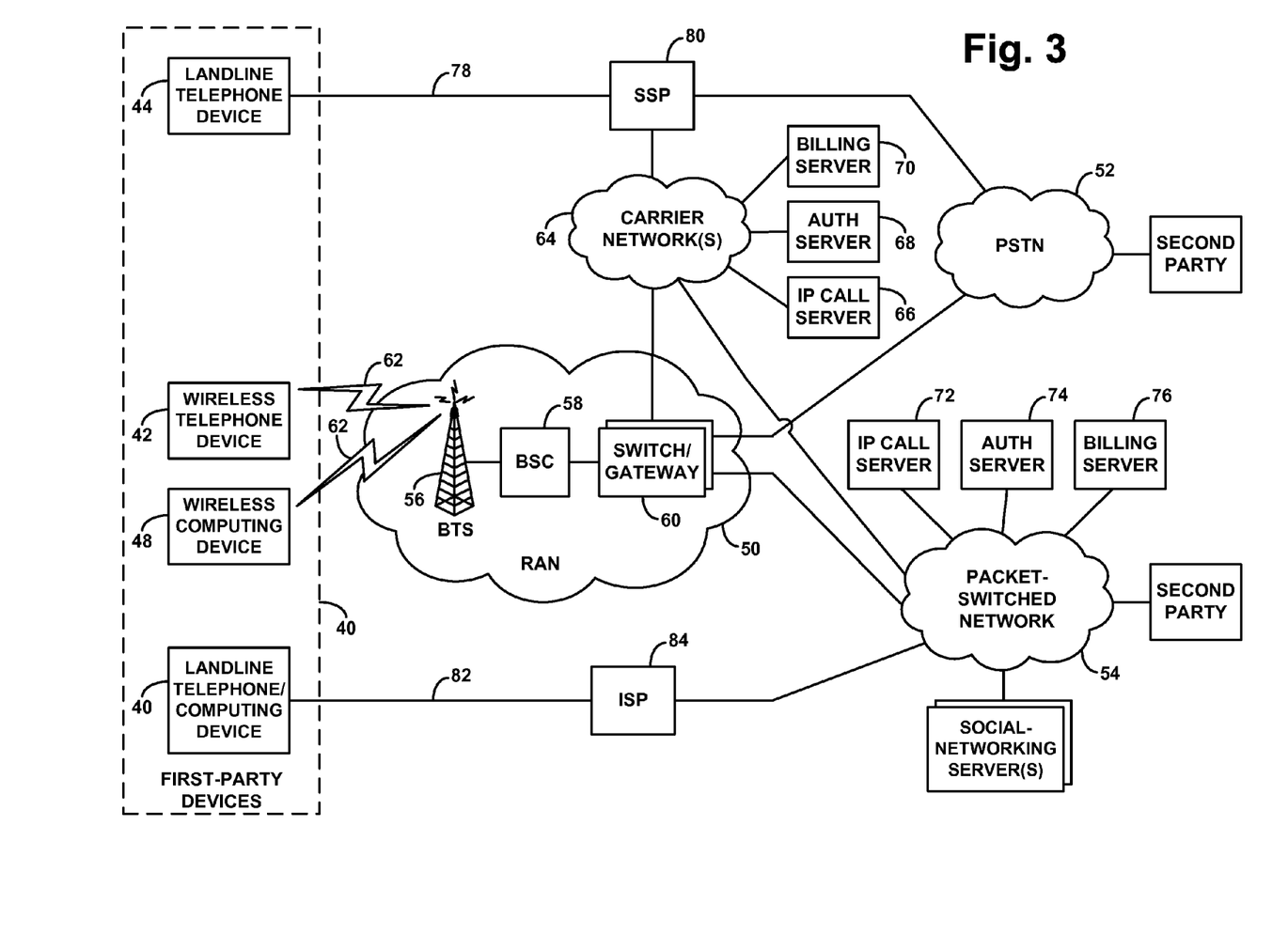
FIG. 3 is another simplified block diagram of a system in which the method can be implemented.

The arrangement shown in FIG. 1 is generally representative of an example arrangement in which the present method can be implemented. In practice, the entities and connections in that example arrangement can take any of a variety of forms and may vary from the arrangement shown. Referring next to FIG. 3, a more detailed but still simplified block diagram is provided to help illustrate several specific example arrangements in which the method can be implemented. As with the discussion above, it should be understood that even these more specific examples are not limiting, and that numerous other examples are possible as well or may be developed in the future.

FIG. 3 depicts a variety of devices ("first party devices") 40 that first party 14 may operate in order to engage in call activity with second party 20 and/or to engage in social-networking interaction including, without limitation, receiving and responding to a connection-establishment prompt presented in accordance with the present method. In particular, the example first party devices 40 include a wireless telephone device 42, a landline telephone device 44, a landline telephone/computing device 46, and a wireless computing device.

The labels "telephone device" and "computing device" used for these various devices may suggest primary functionality of the devices but are not intended to suggest limited or sole functionality of the devices. In practice, for instance, a telephone device may also be a computing device, and a computing device may also be a telephone device. Further, although not shown, various first party devices may be arranged to communicate with each other, so as to share information with each other, through wired and/or wireless connections for instance.

As a general matter, the first party 14 may use wireless telephone device 42, landline telephone device 44, and/or landline telephone/computing device 46 (among possibly other telephone devices) to engage in call activity of various types and with various parties, including the second party 20. Such call activity will include individual phone calls between the first party and one or more other parties, including, for instance, phone calls placed by the first party and/or phone calls placed to the first party. The phone calls may include voice calls, video calls, fax calls, data calls, or other types of calls now known or later developed. Such calls, when connected, generally provide a real-time communication channel, and could thus exclude and be distinguished from connectionless communications such as e-mail or text messaging communications for instance.

For each such phone call, the calling party/device may automatically or manually dial a phone number or other call-address of the other party to facilitate placement of the call, and network infrastructure such as access/transport network(s) 16 may then work to connect the call to the called party/device, such as by paging/ringing the called party/device and, if the called party/device answers, establishing an active communication path between the calling party and the called party. If the called party/device answers the call, the call may then proceed as an active call for an extent of time until the call is ended. On the other hand, if the called party/device does not answer the call, then the call may be deemed a missed or unanswered call.

Wireless telephone device 42, landline telephone device 44, and/or landline telephone/computing device 46 may take various forms appropriate for placing and/or receiving such calls. By way of example and without limitation, a suitable telephone device may be a "plain old telephone system" (POTS) telephone, a cellular mobile telephone, a fax machine, an answering machine, a computer (such as a desktop, notebook, or tablet computer) equipped to place and/or receive calls, or some other type of telephone device with a wireless or wired connection. Further, the telephone device may be arranged to engage in circuit-switched and/or packet-switched call communication, such as legacy channelized communication and/or voice-over-Internet-Protocol (VoIP) or other packetized communication, and the device may engage in analog and/or digital call communication.

FIG. 3 shows wireless telephone device 42 being served by a radio access network (RAN) 50 that provides connectivity with one or more transport networks such as the public switched telephone network (PSTN) 52 and the Internet or other packet-switched network 54 for instance. The RAN may be operated by a wireless service provider, such as a cellular service provider for instance with which the wireless telephone device 42 has a service account, or may be a private RAN owned and operate by the first party or some other entity.

RAN 50 is shown including a base transceiver station (BTS) 56 coupled with a base station controller (BSC) 58, which is in turn coupled with one or more switches or gateways 60, such as a mobile switching center (MSC) or softswitch that provides connectivity with the PSTN 52 and a packet data serving node (PDSN) that provides connectivity with the packet-switched network 54. RAN 50 could take other forms, however. For instance, in a more rudimentary arrangement, RAN 50 could be a wireless access point router arranged to serve wireless client devices on the one hand and to provide connectivity with one or more transport networks on the other hand.

In the RAN arrangement shown, BTS 56 may be a macro and/or femto base station or distributed antenna system that radiates to provide a radio-frequency (RF) coverage area in which served wireless devices can communicate with the BTS over an air interface 62 according to one or more agreed air interface protocols, such as GSM, CDMA, LTE, WiMAX, WIFI, or others now known or later developed. Wireless telephone device 42 would then likewise be equipped with a wireless communication interface for communicating with BTS 56 according to the agreed protocol(s). Further, BSC 58 may function to control various aspects of BTS and air interface operation.

With this example arrangement, wireless telephone device 42 may place a PSTN call to the second party 20 by wirelessly transmitting over the air interface 62 a call origination request message designating the phone number or other call-address of a called party. Upon receipt of the call origination request message, the RAN 50 may then engage in signaling via PSTN 52 to set up the call to the second party 20, and if successful the call may be connected and actively proceed. Further, if the RAN receives a request to set up a call from the second party to the wireless telephone device 42, the RAN may page the wireless telephone device 42 over the air interface 62 and, if the first party answers the call, the call may be connected and actively proceed.

Likewise, wireless telephone device 42 may a VoIP or other packet-switched call to the second party 20 by establishing a wireless packet-data connection via RAN 50 and then engaging in packet-based call setup signaling with the second party or with an entity serving the second party. For instance, the wireless telephone device 42 may transmit a data-session origination message over the air interface 62 and may then work with the RAN to establish a radio link and data link and to obtain an IP address for communicating on the packet-switched network 54. The wireless telephone device 42 may then engage in packet-based session setup signaling such as Session Initiation Protocol (SIP) signaling or the like to set up a packet-based call to the second party 20 and, if the setup is successful the call may then actively proceed. Further, when the wireless telephone device 42 has wireless packet-data connectivity, the second party 20 or an entity serving the second party may just as well engage in packet-based session setup signaling to set up a packet-based call to the wireless telephone device 42 and, likewise, if the setup is successful the call may actively proceed.

In this arrangement, a switch and/or gateway 60 may function as a call server 22 shown in FIG. 1, to facilitate call placement to or from the wireless telephone device 42 and perhaps to manage and record such call activity. For instance, for each call placed to or from the wireless telephone device, the switch/gateway 60 may establish a call detail record specifying the calling party/device, the called party/device, disposition of the call (such as whether the call was successfully connected), the duration of the call, and other data regarding the call. The switch/gateway may thus maintain call activity data for calls placed to and from the wireless telephone device 42, including calls placed between the first party and the second party, correlating this data with the wireless telephone device 42 and/or the first party 14.

FIG. 3 also depicts various other example call servers that can be involved in call placement and/or in managing and recording such call activity. For instance, the figure shows the switch/gateway 60 being coupled with a carrier's core network 64 that provides connectivity with servers including a service control point (SCP) 66, an authentication/authorization server (e.g., authentication center and/or home location register (HLR) 68, and a billing server 70. Further, the figure shows the packet-switched network 54 providing connectivity with servers including an IP call server (e.g., an Internet Multimedia System (IMS) server) 72, an authentication/authorization server (e.g., authentication, authorization, and accounting (AAA) server) 74, and a billing server 76.

SCP 66 may function to provide switch/gateway 60 with advanced-intelligent-network assistance for call placement, to facilitate enhanced call control and services such as prepaid call tracking or the like. In practice, when switch/gateway 60 receives a request to connect a call to or from wireless telephone device 42, the switch/gateway may query to the SCP 66 for call processing assistance, and SCP 66 may apply service logic and then return to the switch/gateway a directive indicating how to handle the call, such as whether to connect the call, whether to forward the call to a different number, or the like. As SCP 66 may be involved with call placement, SCP 66 may similarly record details about calls placed to and from the wireless telephone device 42.

Likewise, for packet-based calls placed via packet-switched network 54, IP call server 72 may function to provide advanced-intelligent-network type assistance as well. For instance, packet-based call setup signaling being transmitted to or from wireless telephone device 42 may flow to or through IP call server 72, and IP call server 72 may apply service logic and handle the call accordingly, such as allowing the call to be connected, forwarding the call to a different number, or the like. As IP call server 72 may thus be involved with call placement, IP call server 72 may also record details about calls placed to and from the wireless telephone device 42.

Authentication/authorization servers 68 and 74 may also be involved with call placement. For instance, when another entity such as switch/gateway 60, SCP 66, or IP call server 72 seeks to handle a call, the entity may query the authentication/authorization server 68, 74, to determine whether the call is authorized. As the authentication/authorization servers may be involved with call placement, they may also record details about calls placed to and from the wireless telephone device 42.

Further, the billing servers 70 and 76 may function primarily to record and facilitate billing for calls placed to and/or from wireless telephone device 42. In practice, for instance, for calls placed to and/or from wireless telephone device 42, switch/gateway 60 may transmit call detail records via carrier network 64 to billing server 70, and billing server 70 may store that data as call activity data for wireless telephone device 42. Further or alternatively, for calls placed to and/or from wireless telephone device 42 using IP call server 72, IP call server 72 may transmit call detail records via packet-switched network 54 to billing server 76, and billing server 76 may store that data as call activity data for wireless telephone device 42.

Landline telephone device 44 and/or landline telephone/computing device 46 may similarly operate to place and receive calls but may do so through landline connections rather than wireless connections.

For instance, landline telephone device 44 is shown coupled by a landline connection (e.g., copper wire, fiber optic, or other non-wireless connection) 78 with a service switching point (SSP) 80 such as a telephone company switch that in turn provides connectivity with the PSTN 52. In practice, landline telephone device 44 may place calls, such as calls to second party 20, on line 78, and SSP 80 may work to connect those calls over PSTN 52. Likewise, when SSP 80 receives calls destined to landline telephone device 44, SSP 80 may connect those calls to the landline telephone device via line 78. SSP 80 may thus function as a call server to facilitate call placement and to record details of call activity for the first party. Further, SSP 80 may similarly be coupled to a carrier network 64 that provides connectivity with call servers such as SCP 66, authentication/authorization server 68, and billing server 70, and those call servers may similarly function as call servers to record call activity as discussed above.

Landline telephone/computing device 46 is then shown coupled by a landline connection 82 with an Internet Service Provider (ISP) node 84 that functions as a gateway to provide connectivity with packet-switched network 54. Thus, landline telephone/computing device 48 may place calls, such as calls to second party 20, via line 82 and ISP 84, with packet-based call setup signaling and call traffic flowing via packet-switched network 54. Further, call servers such as IP call server 72, authentication/authorization server 74, and billing server 76 may similarly be involved and record call activity as discussed above.

FIG. 3 depicts wireless computing device 48 as another device that may be served by RAN 50 and that may thus engage in wireless communication similar to wireless telephone device 42. Unlike wireless telephone device 42, however, wireless computing device 48 might lack the capability of placing and receiving calls and may instead function primarily to engage in other sorts of communication via the RAN. In practice, for instance, wireless computing device 48 may include a web browser and application logic for interacting with various web servers and application servers on the packet-switched network 54. In some cases, on the other hand, such interaction may also be recorded as call activity.

In addition to facilitating call activity, various ones of the first party devices may function as noted above to facilitate social-networking interaction with one or more social-networking servers 24 on packet-switched network 54. For instance, a first party device may be programmed with social-networking application logic respectively for each of one or more social-networking services, and the social-networking applications may be arranged to interwork with a corresponding social-networking server 24 and to provide a user-interface through which the first party can engage in corresponding social-networking interaction. Further, any such device may include more generic functionality such as a web browser through which the first party may similarly interact with one or more social-networking servers 24.

Wireless telephone device 42 and landline telephone/computing device 46, for example may each include both calling functionality and social-network interaction functionality. For instance, in addition to allowing placement and receipt of calls as discussed above, devices 42, 46 may be programmed with one or more social-networking applications corresponding with social-networking services, and/or wireless telephone devices 42, 46 may be programmed with more generic browser functionality to facilitate social-networking interaction. Similarly, wireless computing device 48 may be programmed with one or more social-networking applications corresponding with social-networking services, and/or wireless computing device 48 may be programmed with more generic browser functionality to facilitate social-network interaction.

In practice as noted above, the social-networking server(s) that host particular social-networking services will maintain or have access to profile data for social-network members, including connection data that defines social-network connections in social-network groups. The social-networking service may use that connection data as a basis to distribute information among its members and to allow communications and other interactions between its members. For example, the social-networking service may allow a given member to view the connections, profile data, and social-network updates of the other members who are connected with the given member, and the social-networking service may allow a given member to engage in messaging with other members with whom the given member is connected.

Moreover, a social-networking application installed on a first party device may also maintain or have access to a local copy of the first party's connection data for the corresponding social-networking service. In practice, for instance, the social-networking application may be arranged to synchronize with the social-networking application from time to time, so that both the social-networking server and the social-networking application maintain a copy of the first party's connection data for the social-networking service.

Figure 4:
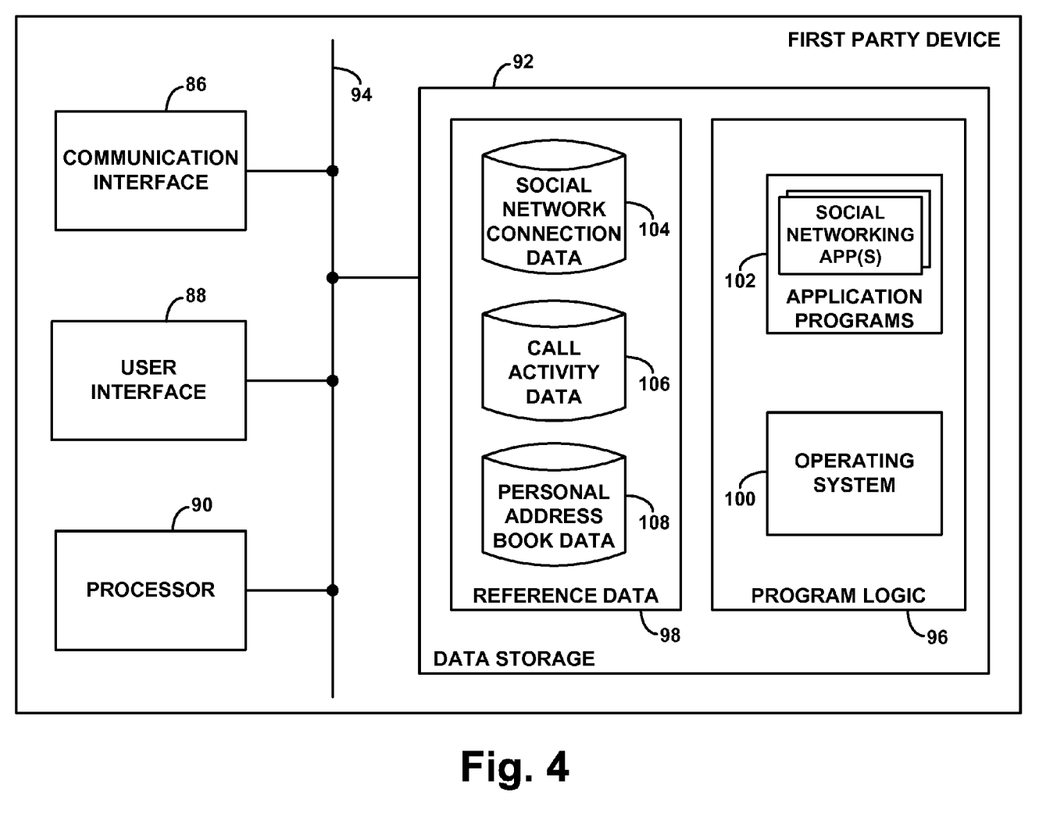
FIG. 4 is a simplified block diagram of a device that can be used in the method.

FIG. 4 is next a simplified block diagram showing some of the components of an example first party device that can be used in the present method. In practice, some of these components or their functions may be distributed across multiple first party devices. However, the components are shown and described as part of a representative first party device for sake of example. The first party device could be any of the first party devices shown in FIG. 3 and described above, or any of a variety of other first party devices.

As shown in FIG. 4, the example first party device includes a communication interface 86, a user interface 88, a processor 90, and data storage 92, all of which may be communicatively linked together by a system bus, network, or other connection mechanism 94.

Communication interface 86 functions to allow the first party device to communicate with access networks and/or transport networks so as to facilitate calling, social-network interaction, and implementation of the present method. For instance, the communication interface 86 may include a chipset and antenna arranged for wireless communication with a radio access network such as RAN 50 that provides connectivity with one or more other entities, such as to facilitate calling and/or social-network interaction. Alternatively or additionally, the communication interface 86 may include a telephone or Ethernet interface arranged to couple with a landline connection as line 78 or 82, that provides connectivity with one or more transports to similarly facilitate calling and/or social-network interaction.

User interface 88 functions to allow the first party device to interact with first party 14, such as to receive input from the first party and to provide output to the first party. As such, the user interface 88 may include input components such as a keypad or keyboard, a touch-sensitive panel, a microphone, and a video camera, and the user interface 88 may include output components such as a display screen and a sound speaker.

Processor 90 may comprise one or more general purpose processors (e.g., microprocessors) and/or one or more special purpose processors (e.g., digital signal processors, or application specific integrated circuits). Data storage 92 may then include one or more volatile and/or non-volatile storage components, such as magnetic, optical, flash, or organic storage, and may be integrated in whole or in part with processor 90.

As shown, the data storage 92 of the example first party device includes program logic 96 and reference data 98.

Program logic 96 may take the form of machine language instructions or other logic executable or interpretable by the processor 90 to carry out various first party device functions described herein. By way of example, as shown, the program logic may include an operating system 100 and one or more application programs 102 installed on the operating system. Distributed among the operating system and/or application programs may then be program logic for providing calling functionality, social-network interaction functionality, and functions specific to the present method.

As shown, for instance, the application programs 102 may include one or more social-networking applications each arranged to interwork with a respective social-networking service. Operating system 100 may include logic defining calling, such as a telephone calling module usable by the first party to place and receive calls in connection with user interface 88, and a call log module operable to present the first party with data regarding call activity data. And operating system 100 may define various messaging mechanism, such as an industry standard short messaging system (SMS) mechanism for instance, through which the first party device can engage in messaging communication. Further, the operating system 100 may include logic specific to the present method. Alternatively, these functions may distributed in different ways.

Reference data 98, in turn, is shown including social-network connection data 104, call-activity data 106, and a personal address book data 108.

Connection data 104 may be maintained and managed by the social-networking applications and, for each social-networking application corresponding with a social-networking service, may specify the connections in each of one or more social-network groups defined for the first party in that social-networking service. Each connection specified by connection data may include respective identifying information, such as a social-networking username or the like to identify the party with whom the first party is connected in the social-network.

Call-activity data 106 may be maintained and managed by the calling module noted above, to provide a record of individual calls, such as any current call and any past calls, involving the first party. This call-activity data 106 may take the form of a typical call-log listing placed calls, received calls, answered calls, missed calls, call durations, and/or other information. Each time the first party device engages in or is the subject of a call or call attempt, the operating system may update this call-activity data 106 to indicate the additional call activity. By reference to this call-activity data, it may thus be possible to determine an extent to which the first party has engaged in call activity with the second party, so as to trigger the additional features of the present method.

Personal address book data 108 may take the form of an address book that lists various contacts, such as people or organizations that the first party might chose to contact. The personal address book may include for each contact a set of contact data, such as name, address, phone numbers, e-mail addresses, and the like, and the operating system may make the personal address book accessible via user interface 88, to enable the first party to look up contact information when desired.

In some cases, the personal address book data 108 may contain some of the first party's social-network connection data. For instance, a process may be carried out to add to each contact in the personal address book data an indication of whether the contact is a member of the first party's social-network group for each of one or more social-networking services. Thus, it may be possible to refer to the first party's personal address book as a way to refer to the first party's social-network connection data. However, social-network connection data may be distinct from mere contact data, as social-network connection relates to connections provided and managed by a social-networking service as discussed above for instance.

Figure 5:
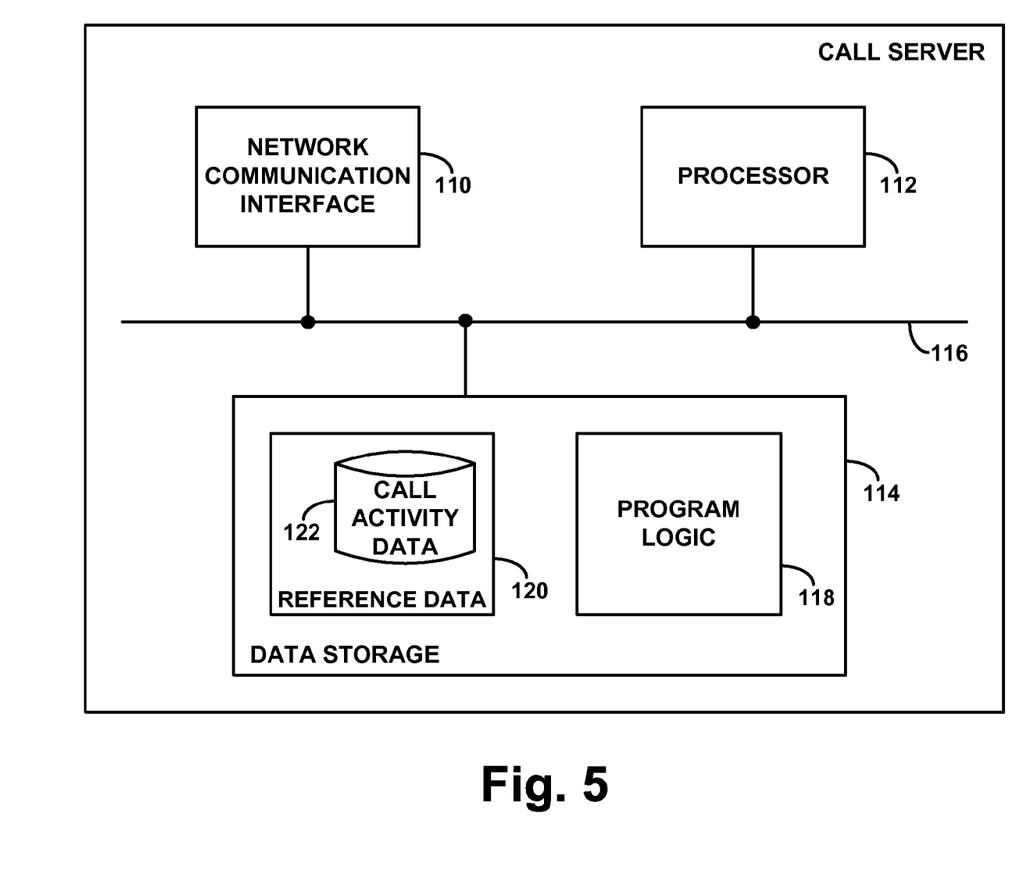
FIG. 5 is a simplified block diagram of a call server that can be used in the method.

FIG. 5 is next a simplified block diagram showing some of the components of an example call server that can be used in the present method. In practice, some of these components or their functions may be distributed across multiple call servers. However, the components are shown and described as part of a representative call server for sake of example. The call server can be any of the call server type devices shown in FIG. 3 and described above, or any other call server such as any entity involved with the calling process and arranged to carry out the call server functions described herein.

As shown in FIG. 5, the example call server includes a network communication interface 110, a processor 112, and data storage 114, all of which may be communicatively linked together by a system bus, network, or other connection mechanism 116.

Network communication interface 110 functions to allow the call server to communicate with various other network entities and end user devices through one or more connections. For example, the network interface may comprise an Ethernet network connection module.

Processor 112 may comprise one or more general purpose processors (e.g., microprocessors) and/or one or more special purpose processors (e.g., digital signal processors, or application specific integrated circuits). And data storage 114 may include one or more volatile and/or non-volatile storage components, such as magnetic, optical, flash, or organic storage, and may be integrated in whole or in part with processor 112. As shown, data storage 114 includes program logic 118 and reference data 120.

Program logic 118 may take the form of machine language instructions or other logic executable or interpretable by the processor 112 to carry out various call server functions described herein. For instance, the program logic 118 may be executable to carry out general call server functions including establishing and maintaining call activity data as discussed above. Further, the program logic 118 may include logic specific to implementation of the present method. Reference data 120 may then include the call activity data 122 as shown. This call activity data may be more extensive than that stored on the first party device, as this data may include specific details to facilitate billing or other uses.

Figure 6:
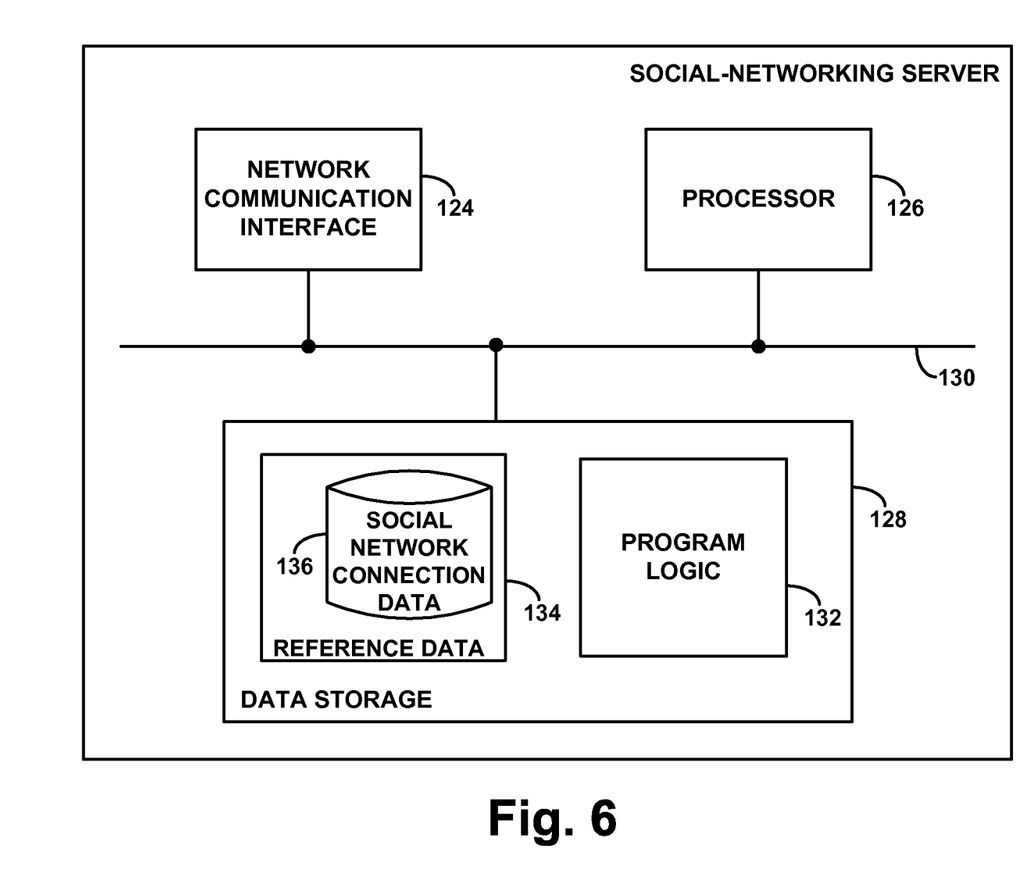
FIG. 6 is a simplified block diagram of a social-networking server that can be used in the method.

FIG. 6 is next a simplified block diagram showing some of the components of an example social-networking server that can be used in the present method. In practice, the social-networking server may host a social-networking service, and may thus maintain or have access to profile data, including connection data, of numerous social-network members and may interact with its members and manage the social-network connections and interactions of its members.

As shown in FIG. 6, the example social-networking server includes a network communication interface 124, a processor 126, and data storage 128, all of which may be communicatively linked together by a system bus, network, or other connection mechanism 130.

Network communication interface 124 functions to allow the call server to communicate with various other network entities and end user devices, such as social network members, through one or more connections. For example, the network interface may comprise an Ethernet network connection module.

Processor 126 may comprise one or more general purpose processors (e.g., microprocessors) and/or one or more special purpose processors (e.g., digital signal processors, or application specific integrated circuits). And data storage 128 may include one or more volatile and/or non-volatile storage components, such as magnetic, optical, flash, or organic storage, and may be integrated in whole or in part with processor 126. As shown, data storage 128 includes program logic 132 and reference data 134.

Program logic 132 may take the form of machine language instructions or other logic executable or interpretable by the processor 126 to carry out various social-networking server functions described herein. For instance, the program logic 132 may be executable to carry out general social-networking server functions including maintaining and managing member connections and interactions for instance. Further, the program logic 132 may include logic specific to implementation of the present method. Reference data 134 may then include profile data for each member of the social-network, including for each member definitions of one or more social-network groups and, for each social-network group, connection data 136 specifying social-network connections defined for the member.

3. Example Operation

As suggested above in connection with FIG. 2, the present method can be carried out by a processing system, such as one or more first party devices 40, one or more call servers 22, one or more social-networking servers 24, and/or one or more other processing entities.

In practice, the method may be carried out periodically and/or in response to one or more triggering events. By way of example, the method may be carried out in response to the first party placing a call to or receiving a call from the second party, possibly regardless of disposition of the call. For instance, by monitoring call activity, a first party device may detect when the first party device places a call to or receives a call from the second party, and the first party device may responsively implement the method. Alternatively, a call server that is involved with call setup and signaling regarding calls placed to and/or from devices registered to the first party (such as a call server in a telecommunication-service-provider network that serves a first party device) may likewise detect when the first party places a call to or receives a call from the second party and, and the call server may responsively implement this method. Still alternatively, when a first party device or call server detects such a call between the first party and second party, the device or server may signal to one or more social-networking servers to cause the social-networking server(s) to implement the method. Furthermore, the method as a whole may be carried out during a call that is detected between the first party and the second party.

As discussed above, as an initial matter, the method may then involve detecting a threshold extent of call activity between the first party and the second party. The threshold extent may, for instance, be at least a predefined non-zero threshold number of such calls. In practice, this threshold may be just one, which may mean that this threshold test would be met once at least one call between the parties has been detected. Alternatively, the threshold may be some other number greater than one (i.e., greater than or equal to two). Setting this threshold higher can help to justify the expansion of the first party's social-network to include the second party, as more calls between the party may represent a stronger social connection between the parties in the first place.

Furthermore, the threshold extent of call activity can include a predefined non-zero threshold extent of active-call time between the first party and the second party, for a single call or for a combination of calls. Setting this threshold to a sufficiently high level can likewise help justify the expansion of the first party's social-network to include the second party, as longer calls or more call duration in total between the first party and the second party may also represent a stronger social connection between the parties in the first place.

In practice, the threshold extent of call activity between the first party and the second party may be detected by a first party device or call server referring to call history data (including perhaps current call setup data, but also possibly including past call activity data). As discussed above, such data may defining various information about calls, such as answered calls, placed calls and/or missed calls, durations of calls, and the like.

Once the threshold extent of call activity between the first party and the second party is detected, the method may then involve determining for each of one or more social-networking services of which the first party is a member whether a social-network group of the first party includes a connection with the second party. As noted above, this function can be carried out by querying the first party's social-network connection data for each such social-networking service.

In practice, for instance, a first party device can carry out this function by consulting the first party's social-network connection data stored on the first party device. For example, the first party device may call each of one or more social-networking applications installed on the device to request each social-networking application to refer to the social-networking application's locally stored connection data to determine whether the connection data includes a connection with the second party. As another example, the first party device may refer to the locally stored social-network connection data without calling a social-networking application.

Alternatively, the first party device could carry out this function by consulting the first party's social-network connection data stored at a social-networking server. For example, the first party device may call each of one or more social-networking applications installed on the device to request each social-networking application to make the determination, and each social-networking application may responsively signal to its respective social-networking server to cause the server to query the first party's social-network connection data. Each social-networking server may then respond with an indication of whether the first party's social-network group includes a connection with the second party, and the social-networking application may in turn respond with the indication as well.

Likewise, a call-server may carry out this function by querying a first party device and/or by querying one or more social-networking servers, to facilitate a determination of whether the first party's social-network group includes a connection with the second party. Similarly, a social-networking server can carry out this function by itself referring to the first party's social-network connection data.

In practice, the first party's social-network connection data for a given social-networking service (and perhaps for a given social-network group within that service) may include an identification of each connection in the first party's social-network group. For instance, for each party connected with the first party, the identification may be the name, e-mail address, phone number, or other identification of the connected party. The act of querying the first party's social-network connection data to determine whether the first party's social-network group includes connection with the second party may then involve determining whether the social-network connection data identifies the second party.

One way this can be done is by using an identification of the second party as indicated in the call activity data as a search query in the social-network connection data. For example, for calls placed by the first party to the second party, the call activity data may include the phone number of the second party and, by reference to a directory or personal address book data may further include the name of the second party. And for calls received from the second party, the phone number and/or name of the second party may similarly be conveyed as caller-identification information in call setup signaling. A first party device and/or call server may thus use such identification data as a search query in the first party's social-network connection data to determine whether the first party's social-network group includes a connection with the second party. Likewise, a social-networking server may receive such identification information from a first party device or call server and may use the identification information as a key to query the first party's social-network connection data.

In some cases, it may also be useful to map the identification information of the second party (such as caller-identification information for instance) to a more specific party identification, to facilitate querying the first party's social-network connection data. A first party device may do this in practice by consulting the first party's personal address book data 108. For instance, the first party device may refer to the personal address book data to obtain more extensive contact information from the contact having the identification information, if such a contact exists in the personal address book. The first party device may then query the first party's social-network connection data based on that further contact information. For instance, the first party device may provide the contact information to a social-networking application installed on the first party device, and the social-networking application may then itself query the connection data based on that contact information or may signal to a corresponding social-networking group to facilitate querying the connection data based on that contact information.

In practice, the determination of whether the first party's social-network group includes a connection with the second party may be made respectively for each of one or more social-networking services in which the first party is a member, such as for each social-networking service as to which the first party has an installed social-networking application on a first party device for instance.

As noted above, for each social-networking service that the processing system thereby determines the first party's social-network group does not currently include a connection with the second party, the method may then involve automatically cause to be presented on a user interface a prompt for the first party to invoke a social-network connection-function for adding to the first party's social-network group a connection with the second party.

The user interface for this purpose can be the user interface 88 on any device, such as any first party device. Thus, if the determination to present this prompt is made by the first party device itself, the first party device may then present the prompt. Whereas, if the determination to present this prompt is made by another entity such as a call server (e.g., one operated by a telecommunication-service provider that serves the first party device) or social-networking server, for instance, that other entity may signal to the first party device to cause the first party device to present the prompt. By way of example, the entity may send an SMS message, web page, or other signal to the first party device, which may itself include the prompt for presentation on the user interface by the first party device. The first party device would then include logic to detect and respond to such a message from the other entity, by responsively presenting the prompt. Further, the prompt may be presented immediately by the user interface, possibly even during one of the detected calls that triggered the method, or may be presented at a later time, such as more convenient time.

In practice, the prompt presented on the user interface may be a visual prompt and/or an audio prompt. Optimally, the prompt would specify each of one or more social-networking services as to which a determination has been made that the first party's social-network connection data does not include a connection with the second party, and the prompt would request the first party to indicate for each specified social-networking service whether to invoke a connection-function for adding to the first party's connection data a connection with the second party.

Recognizing that each of various social-networking services may use different types of connection-adding functions, the prompt that is presented respectfully for each of the one or more social-networking services may be unique to that service. For instance, for a social-networking service that adds "follow" connections in an asymmetric manner, the prompt may take the form of "Follow (so and so second party) on Social-network A". Whereas for a social-networking service that sends invites to establish "friend" connections in a symmetric manner, the prompt may take the form of "Friend (so and so second party) on Social-network B". The respective social-networking services may supply the applicable prompt language and/or service logos for presentation to the first party. For instance, each social-networking application that is installed on the first party device may register such language and/or logo-graphics with the device operating system upon installation, for use in the prompt.

Once the prompt has been presented on the user interface, the method may then involve receiving an affirmative response to the prompt with respect to one or more of the indicated social-networking services, and responsively invoking the connection-function for each social-networking service as to which the affirmative response was received.

Receiving the affirmative response to the prompt may involve receiving an affirmative response from the first party. For instance, if the prompt was presented through a graphical user interface dialog, this function may involve receiving the first party's affirmative response through a graphical user interface element. Alternatively, if the prompt was presented audibly, this function may involve receiving the first party's affirmative response as speech input. If the prompt was sent to the first party device from some other entity such as a call server or social-networking server, receiving the affirmative response to the prompt may also involve that other entity then receiving from the first party device a response signal indicating the affirmative response.

In turn, the act of invoking the connection-function with respect to each social-networking service as to which the first party elected to invoke the function may also take various forms. As noted above, for instance, the function may involve conveying to the social-networking service, such as a locally installed social-networking application or the corresponding social-networking server, an identity of the second party, so as to cause the social-networking service to take action appropriate to the social-networking service for adding to the first party's social-network group a connection with the identified second party.

The identity of the second party that is conveyed for this purpose may be the identification of the second party determined based on the call activity data. Alternatively, the identity may be more specific contact information for the second party, such as contact information determined from a personal address book contact entry for the second party based on the call identification information.

In some cases, however, the call identification information (such as phone number and/or name) may itself be ambiguous. For instance, a particular phone number may be a family phone number (or other shared phone number), and an issue may therefore exist as to which member of the family should be the subject of the prompt and/or, upon receipt of an affirmative response to the prompt, the subject of a new connection for the first party's social-network group. In practice, the method may involve detecting this ambiguity by detecting multiple contacts in the first party's personal address book having the same call identification at issue, or perhaps by querying social-network membership data as a whole and finding multiple social-network members having the same call identification at issue. When such ambiguity is detected, the method may then involve presenting on a user interface a disambiguation prompt, such as listing of the contacts or social-network members who match the call identification at issue, and then receiving from the first party a selection of one or more parties to be the applicable second party.

The social-networking service may then take the action that it deems appropriate to facilitate adding to the first party's social-network group a connection with the second party. For example, if the social-networking service operates in a symmetric manner, the social-networking service may send to the second party an invitation to join the first party's social-network group. Alternatively, the action may involve initiating a follow-function for the first party to receive social-network updates of the second party. For instance, the action may involve simply adding to the first party's social-network connection data a connection with the second party, so that the social-networking service will then convey any applicable and authorized social-network updates of the second party to the first party.

Figure 7:
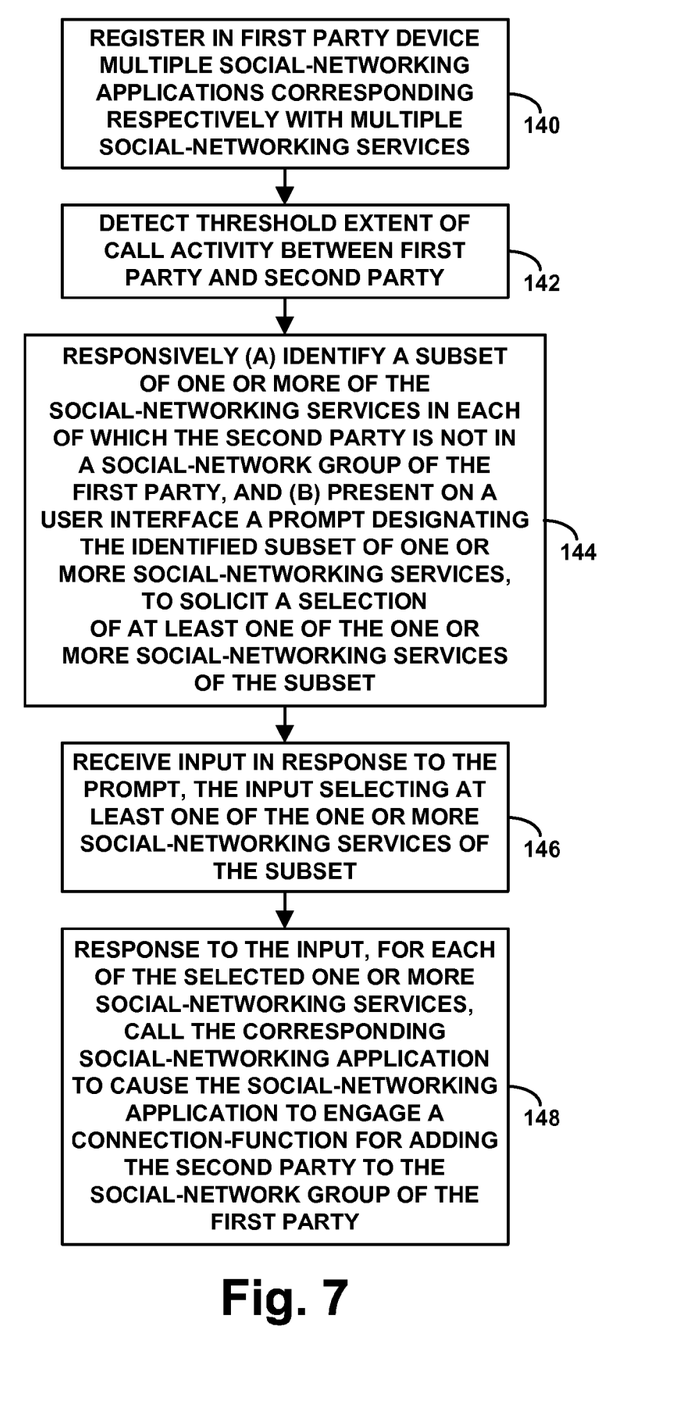
FIG. 7 is another flow chart depicting functions that can be carried out in accordance with the method.

Finally, referring to FIG. 7, another flow chart is provided to illustrate in greater detail functions that can be carried out in accordance with the present method.

As shown in FIG. 7, at step 140, the method may involve registering in a first party computing device (e.g., any of the first party devices shown in FIG. 3 and discussed above) multiple social-networking applications corresponding respectively with multiple social-networking services. For instance, the operating system 100 of the first party device may include a handler module that social-networking applications are arranged to call when they are installed on the device Upon installation of a social-networking application, the handler module thus store in a registry an indication of the social-networking application. Further, through this registration process, the handler module may receive from the social-networking application any prompt data for use in the present method and other data, and may store that data as well.

At step 142, the computing device may then detect at least a threshold extent of call activity between the computing device and a second party, in the manner discussed above for instance. In turn, at block 144, the method may then involve, the computing device carrying out particular functions in response to detecting at least the threshold extent of call activity between the computing device and the second party. For instance, the computing device may then determine respectively for each of the social-networking services whether the second party is in a social-network group of the first party, and the computing device may thereby identify a subset of one or more of the social-networking services in each of which the second party is not in a social-network group of the first party. In turn, the computing device may then present on a user interface a prompt designating the identified subset of one or more social-networking services, to solicit a selection of at least one of the one or more social-networking services of the subset.

At step 146, the computing device may then receive input in response to the prompt, the input selecting at least one of the one or more social-networking services of the subset. And at step 148, in response to that input, for each of the selected one or more social-networking services, the computing device may call the corresponding social-networking application to cause the social-networking application to engage a connection-function for adding the second party to the social-network group of the first party.

Note that although the foregoing description optimally involves presenting to the first party a prompt to elicit a request to add a connection with the second party, the method could also extend to an arrangement in which a prompt is not presented but in which threshold call activity between the first party and the second party automatically triggers (i) a determination of whether the second party is in the first party's social-network group, and (ii) in response to the determination being that the second party is not in the first party's social-network group, invoking the social-network connection-function for adding to the first party's social-network group a connection with the second party. User authorization for this type of automated social-network expansion could be provided in advance by the first party, such as by the first party setting appropriate permissions through a configuration interface for instance.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

We claim:

1. A method comprising:
    detecting by a processing system at least a threshold extent of call activity between a first party and a second party, wherein detecting at least the threshold extent of call activity between the first party and the second party comprises detecting at least a threshold extent of active-call time between the first party and the second party;
    responsive to the detecting of at least the threshold extent of call activity between the first party and the second party, making a determination by the processing system of whether a social-network group of the first party includes a connection with the second party;
    responsive to the determination being that the social-network group of the first party does not include a connection with the second party, causing a user interface to present a prompt to invoke a social-network connection function for adding to the social-network group a connection with the second party;
    after causing the user interface to present the prompt, receiving an affirmative response to the presented prompt; and
    responsive to receiving the affirmative response, invoking the connection-function for adding to the social-network group a connection with the second party.

2. The method of claim 1, wherein making the determination comprises querying social-network data.

3. The method of claim 1, wherein a telephone device operated by the first party has an installed social-networking application that maintains social-network data, and wherein making the determination comprises querying the social-networking application.

4. The method of claim 1, wherein a social-networking group stores social-network data, and wherein making the determination comprise querying the social-networking group.

5. The method of claim 1, wherein invoking the connection-function comprises causing to be sent to the second party an invitation for the second party to join the social-network group of the first party.

6. The method of claim 1, wherein invoking the connection-function for adding to the social-network group a connection with the second party comprises initiating a follow-function for the first party to receive social-network updates of second party.

7. The method of claim 1, wherein a telephone device operated by the first party has an installed social-networking application, and wherein invoking the connection-function comprises passing an identification of the second party to the social-networking application for use by the social-networking application to invoke the connection-function.

8. The method of claim 1, wherein a telephone device operated by the first party has an installed social-networking application, and wherein the prompt is provided at least in part by the social-networking application.

9. The method of claim 1, carried out during at least one phone call between the first party and the second party.

10. The method of claim 1, wherein detecting at least the threshold extent of call activity comprises detecting at least one phone call from call-history data defining at least one of an answered call, a placed call, and a missed call.

11. The method of claim 10, wherein the call-history data is stored on a telephone device operated by the first party, wherein the processing system comprises the telephone device, wherein the telephone device includes the user interface, and wherein detecting by the processing system at least the threshold extent of call activity comprises the telephone device detecting at least the threshold extent of call activity.

12. The method of claim 11, wherein the telephone device is a cellular mobile telephone.

13. The method of claim 1, wherein a telecommunication-service-provider network serves a telephone device operated by the first party, wherein the telephone device includes the user interface, and wherein:
    detecting at least the threshold extent of call activity comprises the telecommunication-service-provider network detecting at least the threshold extent of call activity; and
    causing the user interface to present the prompt comprises the telecommunication-service provider network causing the telephone device to present the prompt on the user interface.

14. The method of claim 1, wherein detecting at least the threshold extent of call activity between the first party and the second party comprises detecting at least a threshold number of phone calls between the first party and the second party, wherein the threshold is greater than or equal to two.

15. The method of claim 1, wherein making the determination of whether the social-network group of the first party includes a connection with the second party comprises querying social-network data, wherein the social-network data includes an identification of each connection in the social-network group of the first party, and wherein querying the social-network data comprises determining whether the social-network data identifies the second party as being a connection in the social-network group of the first party.

16. The method of claim 1, wherein the call activity comprises a given call placed to the first party by the second party, wherein a telephone device operated by the first party receives caller-identification information for the given call, and wherein making the determination of whether the social-network group of the first party includes a connection with the second party comprises querying social-network group data using the caller-identification information.

17. The method of claim 16, wherein using the caller-identification information in making the determination comprises querying social-network connection data to determine whether the social-network connection data specifies a connection corresponding with the caller-identification information.

18. The method of claim 16, wherein using the caller-identification information in making the determination comprises mapping the caller-identification information to a party identification, and in turn using the party identification in making the determination.

19. The method of claim 18, wherein the telephone device stores a personal address book that correlates the caller-identification information with the party identification, and wherein mapping the caller-identification information to the party identification comprises using at least part of the caller-identification information for querying the personal address book to obtain the party identification.

20. The method of claim 1, wherein the active-call time between the first party and the second party comprises time for which one or more calls between the first party and the second party proceed until ending.

21. A wireless communication device (WCD) comprising:
    a wireless communication interface;
    a user interface;
    a processor;
    data storage; and program logic stored in the data storage and executable by the processor (i) to detect at least a threshold extent of call activity between the WCD and a call party, wherein detecting at least the threshold extent of call activity between the WCD and the call party comprises detecting at least a threshold extent of active-call time between the WCD and the call party, (ii) upon detecting at least the threshold extent of call activity between the WCD and the call party, to make a determination of whether a social-network group of a user of the WCD includes a connection with the call party and (iii) in response to the determination being that the social-network group of the user of the WCD does not include a connection with the call party, to present on the user interface a prompt for the user to invoke a connection-function for adding to the social-network group a connection with the call party.

22. The WCD of claim 21, wherein the program logic is executable to make the determination by querying social-network data stored in the data storage.

23. The WCD of claim 21, further comprising at least one social-networking application stored in the data storage and executable by the processor,
wherein the program logic is executable to make the determination by querying the at least one social-networking application.

24. The WCD of claim 21, wherein the program logic is further executable to receive an affirmative response to the prompt and to responsively invoke the connection-function for adding to the social-network group a connection with the call party.

25. The WCD of claim 24, further comprising at least one social-networking application stored in the data storage and executable by the processor,
wherein the program logic is executable to invoke the connection-function by passing to the social-networking application identification-information for the call party, to enable addition to the social-network group of a connection with the call party.

26. A computer server comprising:
a network communication interface;
a processor;
data storage; and
program instructions stored in the data storage and executable by the processor (i) to detect at least a threshold extent of call between a first party and a second party, wherein detecting at least the threshold extent of call activity between the first party and the second party comprises detecting at least a threshold extent of active-call time between the first party and the second party, (ii) upon detecting at least the threshold extent of call activity between the WCD and the call party, to make a determination of whether a social-network group of the first party includes a connection with the second party, and (iii) in response to the determination being that the social-network group of the first party does not include a connection with the second party, to cause to be presented on a user interface a prompt for the first party to invoke a connection-function for adding the second party to the social-network group of the first party.

27. The computer server of claim 26, wherein the user interface is a component of a telephone device operated by the first party for at least one phone call of the call activity, and wherein causing the prompt to be presented on the user interface comprises transmitting via the network communication interface to the telephone device a directive for the telephone device to present the prompt.

28. The computer server of claim 26, wherein the program instructions are executable to make the determination by querying a social-networking group via the network communication interface.

29. A method comprising:
registering in a computing device a plurality of social-networking applications corresponding respectively with a plurality of social-networking services, the computing device being used by a first party;
the computing device detecting at least a threshold extent of call activity between the computing device and a second party, wherein detecting at least the threshold extent of call activity between the computing device and the second party comprises detecting at least a threshold extent of active-call time between the computing device and the second party;
responsive to the detecting of at least the threshold extent of call activity between the computing device and the second party, (i) the computing device determining respectively for each of the social-networking services whether the second party is in a social-network group of the first party, and the computing device thereby identifying a subset of one or more of the social-networking services in each of which the second party is not in a social-network group of the first party, and (ii) the computing device presenting on a user interface a prompt designating the identified subset of one or more social-networking services, the prompt soliciting a selection of at least one of the one or more social-networking services of the subset;
the computing device receiving input in response to the prompt, the input selecting at least one of the one or more social-networking services of the subset; and
responsive to the input, for each of the selected one or more social-networking services, the computing device calling the corresponding social-networking application to cause the social-networking application to engage a connection-function for adding the second party to the social-network group of the first party.

30. The method of claim 29, wherein the computing device comprises a cellular telephone used for the at least one phone call.

31. A method comprising:
detecting by a processing system at least a threshold extent of call activity between a first party and a second party, wherein detecting at least the threshold extent of call activity between the first party and the second party comprises detecting at least a threshold extent of active-call time between the first party and the second party;
responsive to the detecting of at least the threshold extent of call activity between the first party and the second party, making a determination by the processing system of whether a social-network group of the first party includes a connection with the second party; and
responsive to the determination being that the social-network group of the first party does not include a connection with the second party, invoking by the processing system a process to add to the social-network group of the first party a connection with the second party.

\* \* \* \* \*